(12) United States Patent
Yang et al.

(10) Patent No.: US 12,085,805 B2
(45) Date of Patent: Sep. 10, 2024

(54) DIFFUSION PLATE FOR USE IN BACKLIGHT MODULE WITH LOW OPTICAL PATH DISTANCE

(71) Applicant: ENTIRE TECHNOLOGY CO., LTD., Taoyuan (TW)

(72) Inventors: Chih Wen Yang, Taoyuan (TW); Yu Wei Chang, Taoyuan (TW)

(73) Assignee: ENTIRE TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 18/540,610

(22) Filed: Dec. 14, 2023

(65) Prior Publication Data
US 2024/0210755 A1    Jun. 27, 2024

(30) Foreign Application Priority Data

Dec. 22, 2022   (TW) .................................. 111149442

(51) Int. Cl.
*G02F 1/00*      (2006.01)
*G02F 1/13357*   (2006.01)

(52) U.S. Cl.
CPC .................. *G02F 1/133606* (2013.01); *G02F 1/133603* (2013.01)

(58) Field of Classification Search
None
See application file for complete search history.

(56) References Cited

U.S. PATENT DOCUMENTS

| 2012/0026429 | A1* | 2/2012 | Chen ...................... G02B 6/004 362/609 |
| 2019/0129253 | A1* | 5/2019 | Moon ................ G02F 1/133514 |
| 2020/0192144 | A1* | 6/2020 | Oh ....................... G02F 1/13363 |
| 2023/0359085 | A1* | 11/2023 | Matsuno ............ G02F 1/133603 |

* cited by examiner

*Primary Examiner* — Gerald J Sufleta, II

(57) ABSTRACT

The invention discloses a diffusion plate for use in a backlight module with a low optical path distance (OD), which can be assembled on a backlight module with a plurality of light-emitting diodes (LEDs) as the light source below. Different diffusion particle additives are added to the surface layers and the main layer of the diffusion plate, and then extrude it with foaming extrusion technology. By making different combinations of the refractive index and the amount of the original resin materials, microbubbles, and diffusion particle additives of the surface layers and the main layer, the light refractive index of the upper and lower surface layers is substantially greater than which of the main layer. Such that, the light emitted by the light source below can be diffused more effectively, and thereby achieving a better shading effect of MURA, so as to produce a uniform surface light source.

12 Claims, 8 Drawing Sheets

DIFFUSION PLATE FOR USE IN BACKLIGHT MODULE WITH LOW OPTICAL PATH DISTANCE

BACKGROUND OF INVENTION

1. Field of the Invention

The invention refers to a diffusion plate for use in backlight module with low optical path distance (OD), and particularly refers to a diffusion plate that can be assembled on a backlight module and can provide good light diffusion effect at low OD, thereby shielding MURA (light and dark bands) to produce a uniform surface light source.

2. Description of the Prior Art

Under the development of the backlight display technologies, as the design of modern backlight displays tends to be thinner, the backlight module is bound to face the demand for ultra-thin. When the optical path distance (OD) of the backlight module is reduced, the light intensity is higher, and the MURA (light and dark bands) is worse. Therefore, if the traditional diffusion plate is continued to be used on the backlight module with low OD, the effect of light diffusion can no longer meet the requirements.

In addition, there are mainly two types of light-emitting diode (LED) light sources used in traditional backlight displays; one is for blue LED to excite yellow phosphor, and the two colors are mixed into white light; the other one is for three primary color LEDs to be mixed into white light. However, the color gamut of the conventional backlight displays of these two light sources is relatively low, and the color representation is insufficient.

At present, the light source of the backlight display uses blue LEDs as light sources to excite green and red quantum dots, and the three colors of light are mixed into white light, which can increase the color gamut value to NTSC 120%. However, this backlight display still has the following disadvantages. First of all, quantum dots are easily affected by water vapor and oxygen to reduce or even lose their activity. After long-term use, quantum dots will fail, resulting in abnormal display color problems. Secondly, blue LEDs excite green and red quantum dots, and blue, green, and red light are mixed into white light, and the light intensity must be consistent to avoid insufficient red/green light conversion. However, because the surrounding light intensity is lower than the central light intensity, the phenomenon of blue light is caused in the surrounding area, and the color is uneven. Furthermore, most of the existing quantum dot films block water vapor and oxygen by attaching a water-blocking and gas-blocking film on the surface, but this method can only block the water vapor and oxygen from entering the quantum dot film from the upper surface, and cannot prevent water vapor and oxygen entering from the side end faces of the quantum dot film. Therefore, after a period time of use, the four sides of the quantum dot film of the backlight display will still be invaded by water vapor and oxygen to make the quantum dots ineffective, resulting in abnormal color in the surrounding area of the backlight display. Although some manufacturers have tried to coat the four side end faces of the quantum dot film of the backlight display with protective coatings, this method requires multiple processing processes, which is complicated, high cost and low yield.

Therefore, the present invention provides a diffusion plate for use in backlight module with low OD, which can be assembled on a backlight module and can provide good light diffusion effect at low OD, thereby shielding MURA (light and dark bands) to produce a uniform surface light source.

SUMMARY OF THE INVENTION

The primary objective of the present invention is to provide a diffusion plate for use in a backlight module with a low optical path distance (OD). Different diffusion particle additives are added to the surface layers and the main layer of the diffusion plate, and then extrude it with foaming extrusion technology. By making different combinations of the refractive index and the amount of the original resin materials, microbubbles, and diffusion particle additives of the surface layers and the main layer, the light refractive index of the upper and lower surface layers is substantially greater than which of the main layer. Such that, the light emitted by the light source below can be diffused more effectively, and thereby achieving a better shading effect of MURA, so as to produce a uniform surface light source.

Another objective of the present invention is to provide a diffusion plate which can be assembled on a backlight module with a plurality of blue light-emitting diodes (LEDs) as the bottom light source. A plurality of microstructures having a plurality of concave portions and convex portions are formed on the surface of the diffusion plate. A quantum dot layer comprising a plurality of green quantum dots and a plurality of red quantum dots is applied on the concave portions of the microstructures. Then, a water-blocking and gas-blocking layer is arranged on the upper surface of the quantum dot layer. The quantum dot layer located in the concave portions is separated by the convex portions of the microstructures into small parts independent of each other. In this way, the water vapor and oxygen from the outside cannot penetrate the four side end faces of the quantum dot layer and invade the entire quantum dot layer, such that, the diffusion plate of the invention can have the advantages of simple process, low cost and high production yield.

In order to achieve aforementioned objective, the present invention discloses a diffusion plate for use in a backlight module with a low optical path distance, said backlight module comprising a substrate and a plurality of light-emitting elements arranged on the substrate in an array form; said diffusion plate being located above the substrate and comprising:

a plate body, having an upper surface and a lower surface; said lower surface of the plate body facing the substrate; the plate body being a multi-layer structure made by co-extrusion molding process and comprising a main layer, an upper surface layer and a lower surface layer; the upper surface layer being superimposed on a side of the main layer facing the upper surface, and the lower surface layer being superimposed on another side of the main layer 101 facing the lower surface;

a first diffusion particle additive, added to the main layer; the first diffusion particle additive including a plurality of first diffusion particles; the weight percentage of the added first diffusion particle additive in the main layer being a first weight percentage; each of the first diffusion particles having a first material refractive index; and a second diffusion particle additive, added to the upper surface layer and the lower surface layer; the second diffusion particle additive including a plurality of second diffusion particles; the weight percentage of the added second diffusion particle additive in the upper surface layer and the lower surface layer being a second weight percentage; each of the second diffusion particles having a second material refractive index;

wherein the diffusion plate meets at least one of the following two conditions:

Condition 1: the first material refractive index of the first diffusion particles is smaller than the second material refractive index of the second diffusion particles; and Condition 2: the first weight percentage of the first diffusion particle additive is less than the second weight percentage of the second diffusion particle additive.

In a preferred embodiment, a base material of the plate body includes at least one of the following: polycarbonate (PC), polystyrene (PS), polymethyl methacrylate (PMMA, commonly known as acrylic), polyethylene (PE), polypropylene (PP), and polyethylene terephthalate (PET).

In a preferred embodiment, the first diffusion particles contained in the first diffusion particle additive include at least one of the following polymer particles: silicone beads, acrylic beads (PMMA beads), polystyrene beads (PS beads), and acrylic-polystyrene copolymer beads (PMMA-PS beads); wherein a particle size of the first diffusion particles is between 1-4 μm; a value of the first material refractive index is between 1.42 and 1.5; the first weight percentage of the first diffusion particle additive added in the main layer is between 1-4%.

In a preferred embodiment, the second diffusion particles contained in the second diffusion particle additive include at least one of the following inorganic particles: calcium carbonate, barium sulfate, titanium oxide, talc, mica, and boron nitride; wherein a particle size of the second diffusion particles is between 0.05-8 μm; a value of the second material refractive index is between 1.5 and 2.6; the second weight percentage of the second diffusion particle additive added in the upper surface layer and the lower surface layer is between 0.1-1.5%.

In a preferred embodiment, the second diffusion particles contained in the second diffusion particle additive include at least one of the following polymer particles: silicone beads, acrylic beads (PMMA beads), polystyrene beads (PS beads), and acrylic-polystyrene copolymer beads (PMMA-PS beads); wherein a particle size of the second diffusion particles is between 15-25 μm; a value of the second material refractive index is between 1.42 and 1.5; the second weight percentage of the second diffusion particle additive added in the upper surface layer and the lower surface layer is between 5-10%; wherein, the second weight percentage is greater than the first weight percentage, and the particle size of the second diffusion particles is greater than the particle size of the first diffusion particles.

In a preferred embodiment, the diffusion plate further comprises: a plurality of microstructures and an upper optical film. The plurality of microstructures are disposed on at least the upper surface of the plate body in an array form. The upper optical film is attached to the upper surface of the plate body by an optical glue; wherein a thickness of the optical glue is between 5-20 μm.

In a preferred embodiment, the diffusion plate further comprises: a plurality of microstructures, a lower optical film, and a reflective film. The microstructures are disposed on at least the lower surface of the plate body in an array form. The lower optical film is attached to the upper surface of the plate body by an optical glue. The reflective film is attached below the lower optical film. The reflectance of the reflective film for light with a wavelength of 500 nm or less is <20%, and the reflectance of the reflective film for light with a wavelength of 500 nm or greater is >90%.

In a preferred embodiment, the diffusion plate further comprises: a plurality of microstructures, a quantum dot layer, and a water-blocking and gas-blocking layer. The microstructures are disposed on at least the upper surface of the plate body in an array form. The microstructures form a plurality of convex portions and a plurality of concave portions on the upper surface of the plate body. The concave portions are separated by the convex portions, such that the concave portions are independent and not communicated with each other. The quantum dot layer is disposed at the plurality of the concave portions on the upper surface of the plate body; wherein, a thickness of the quantum dot layer is t1, a distance from a top of the convex portions to a bottom of the concave portions is t2; wherein t1<t2. The water-blocking and gas-blocking layer is disposed on the upper surface of the plate body and covering the plurality of the convex portions and the quantum dot layer.

In a preferred embodiment, the lower surface of the plate body is also formed with the plurality of the microstructures, the quantum dot layer and the water-blocking and gas-blocking layer; the microstructures form the convex portions and the concave portions on the lower surface of the plate body; the concave portions on the lower surface are separated by the convex portions, so the concave portions on the lower surface of the plate body are independent and not communicated with each other; the quantum dot layer located on the lower surface of the plate body is disposed at the concave portions on the lower surface of the plate body; moreover, the water-blocking and gas-blocking layer disposed on the lower surface covers the plurality of the convex portions and the quantum dot layer on the lower surface of the plate body.

In a preferred embodiment, a plurality of quantum dots is included in the quantum dot layer; the quantum dots are nanocrystal semiconductor materials composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm.

In a preferred embodiment, the microstructures include a plurality of pyramid-shaped microstructures; t2 is between 6~200 μm; a thickness of the water-blocking and gas-blocking layer is t3, and t3 is between 5~100 μm.

In a preferred embodiment, wherein, t2 is between 25 and 50 μm, t1 is between 10 and 40 μm, and t3 is between 10 and 30 μm.

In a preferred embodiment, a maximum width of the convex portion is between 50 and 500 μm, and a distance between two adjacent convex portions is between 50 and 1000 μm.

In a preferred embodiment, the plate body is formed by foam extrusion molding, and includes a plurality of microbubbles in the plate body; a weight reduction rate of the microbubbles to the plate body is 15-25%, and an average size of the microbubbles is between 60~800 μm; wherein, a calculation formula of the weight reduction rate is:

weight reduction rate (%)=$(W1-W2)/W2*100\%$;

$W1=H*(L1*L2*D)$;

wherein:

H is an average thickness of the plate body (mm);
L1 is a length of the plate body (mm);
L2 is a width of the plate body (mm);

D is a density of a raw material of the plate body (g/mm$^3$);

W1 is a theoretical weight (g) of the plate body, that is, the weight when the microbubbles are not included;

W2 is an actual weight (g) of the plate body, that is, the actual weight of the plate body containing a plurality of the microbubbles is actually weighed by a scale.

In a preferred embodiment, the microbubbles are generated by adding a foaming agent and a nucleating agent during the foam extrusion molding of the plate body; the nucleating agent comprises at least one of the following: calcium carbonate, silicon dioxide, and calcium oxide; a weight percentage of the added nucleating agent is 0.1%-0.5%.

DESCRIPTION OF THE PREFERRED EMBODIMENT

The invention discloses a diffusion plate for use in a backlight module with a low optical path distance (OD). Different diffusion particle additives are added to the surface layers and the main layer of the diffusion plate, and then extrude it with foaming extrusion technology. By making different combinations of the refractive index and the amount of the original resin materials, microbubbles, and diffusion particle additives of the surface layers and the main layer, the light refractive index of the upper and lower surface layers is substantially greater than which of the main layer. Such that, the light emitted by the light source below can be diffused more effectively, and thereby achieving a better shading effect of MURA, so as to produce a uniform surface light source.

In order to more clearly describe the diffusion plate for use in a backlight module with a low optical path distance (OD proposed by the present invention, the following will be described in detail with the accompanying drawings.

Figure 1:
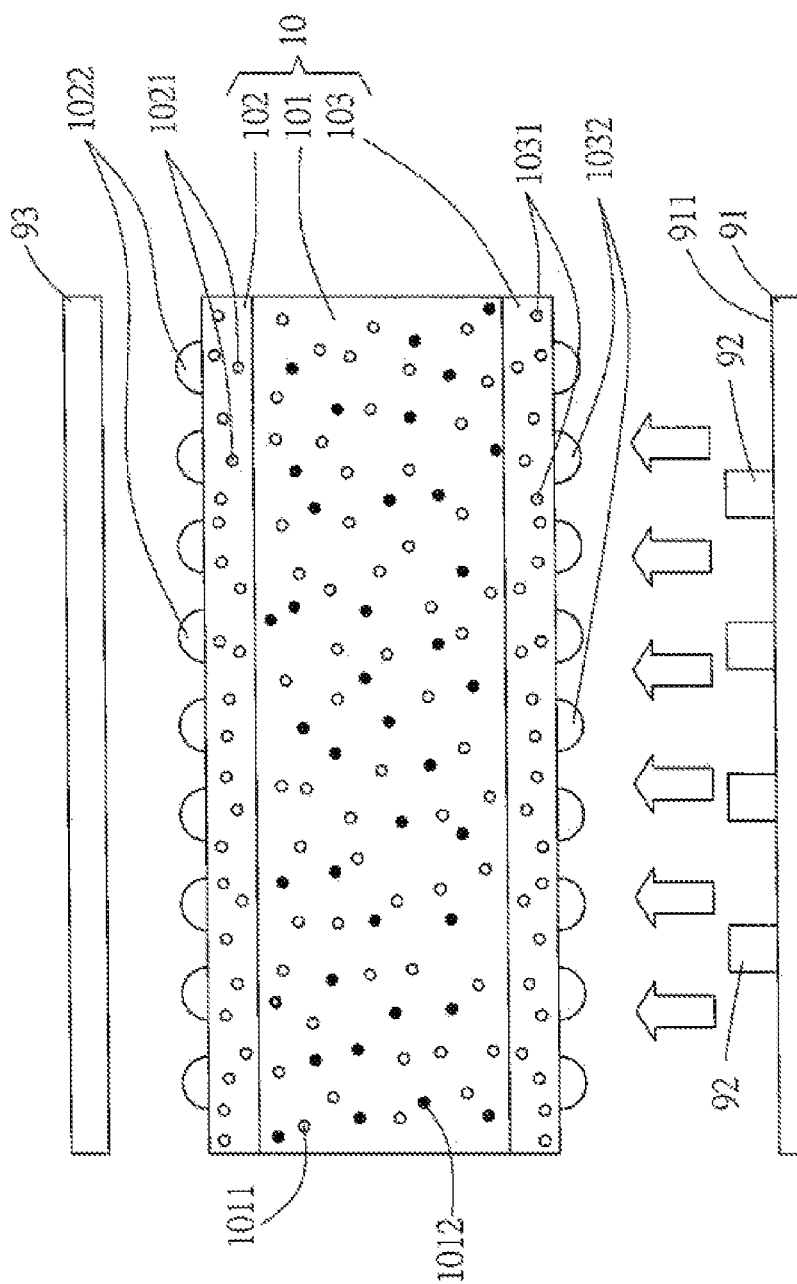
FIG. 1 is a cross-sectional schematic diagram of the first embodiment of the diffusion plate of the present invention installed on a backlight module with a low OD in order to form a backlight display.

Please refer to FIG. 1, which is a cross-sectional schematic diagram of the first embodiment of the diffusion plate of the present invention installed on a backlight module with a low OD in order to form a backlight display. In the first embodiment, the backlight module includes from bottom to top: a substrate 91, a plurality of light-emitting elements (LEDs) 92 and the diffusion plate of the present invention. A circuit layout (not shown in figures) is provided on the substrate 91. A plurality of light-emitting elements (LEDs) 92 are arranged on the substrate 91 in an array form and are electrically coupled to the circuit layout. In the present invention, the light-emitting elements 92 are blue light-emitting diodes (blue LEDs), which can emit blue light upward toward the plate body 10 of the diffusion plate. The light-emitting elements 92 can be conventional blue LEDs, blue Mini LEDs or even blue Micro LEDs. A reflection layer (not numbered in figures) is disposed on the top surface 911 of the substrate 91. The reflection layer can be white or other colors or surfaces with better light reflection effect, and is used to reflect the light upward toward the plate body 10 of the diffusion plate. The plate body 10 of the diffusion plate is located above the substrate 91 and adjacent to the plurality of light-emitting elements 92 arranged on the substrate 91, and generally speaking, there will be no other components between the light-emitting elements 92 arranged on the substrate 91 and the plate body 10 of the diffusion plate.

In the present invention, the diffusion plate comprises: a plate body 10, a first diffusion particle additive, a second diffusion particle additive, a plurality of microbubbles 1012, and a plurality of microstructures 1022, 1032. The plate body 10 has an upper surface and a lower surface. The lower surface of the plate body 10 faces the substrate 91 and is used as a light-input surface; the light emitted by the light-emitting elements 92 enters the plate body 10 through the lower surface (light-input surface). In contrast, the upper surface of the plate body 10 is the light-output surface. After the light entering the plate body 10 undergoes refraction and diffusion effects, the light is output from the upper surface (light-output surface) of the plate body 10 and directed to the liquid crystal display panel (LCD panel 93) located above. The plate body 10 is a multi-layer structure composed of at least two layers of different materials by co-extrusion molding process. Specially speaking, the plate body 10 is a multi-layer structure composed of a main layer 101, an upper surface layer 102 and a lower surface layer 103; three layers in total. The upper surface layer 102 is superimposed on the side of the main layer 101 facing the upper surface, and the lower surface layer 103 is superimposed on the side of the main layer 101 facing the lower surface. The base material of the plate body 10 of the diffusion plate can be a non-crystalline or semi-crystalline plasticized material, and the base material includes at least one of the following: polycarbonate (PC), polystyrene (PS), polymethyl methacrylate (PMMA, commonly known as acrylic), polyethylene (PE), polypropylene (PP), polyethylene terephthalate (PET), or a copolymer of any of the foregoing materials. In this embodiment, the thickness of the plate body 10 is preferably between 0.8 mm and 2.5 mm. In this embodiment, the applicable thickness ratio of the thickness of the main layer 101 to the total thickness of the two surface layers 102, 103 (the sum of the thicknesses of the upper and lower surface layers) can be implemented between the range of 9.5:0.5~1:1; however, the better implementation range thereof is between 9:1~7:3. The base materials of the main layer 101 and the two surface layers 102, 103 can be made of the same material or different materials.

In this embodiment, the first diffusion particle additive includes a plurality of first diffusion particles 1011, which are added to the main layer 101. The weight percentage of the added first diffusion particle additive in the main layer 101 is a first weight percentage; each of the first diffusion particles 1011 has a first material refractive index. The second diffusion particle additive includes a plurality of second diffusion particles 1021, 1031, which are respectively added in the upper surface layer 102 and the lower surface layer 103. The weight percentage of the added second diffusion particle additive in the upper surface layer 102 and the lower surface layer 103 is a second weight percent; each of the second diffusion particles 1021, 1031 has a second material refractive index. The technical characteristic of the present invention is that the diffusion plate meets at least one of the following two conditions:

Condition 1: The first material refractive index of the first diffusion particles 1011 is smaller than the second material refractive index of the second diffusion particles 1021, 1031;

Condition 2: The first weight percentage of the first diffusion particle additive is less than the second weight percentage of the second diffusion particle additive.

By satisfying the above-mentioned Condition 1, or Condition 2, or both conditions are met, the refractive index of the upper and lower surface layers 102, 103 which are added with the second diffusion particles 1021, 1031 of relatively high refractive index or/and concentration (weight percentage) will be substantially higher than the refractive index of the main layer 101 which is added with the first diffusion particles 1011 of relatively low refractive index or/and concentration (weight percentage), so as to make the upper and lower surface layers 102, 103 to provide a slight reflection effect on the sides facing the main layer 101. Therefore, after the light emitted by the light-emitting elements 92 enters the interior of the plate body 10, a part of the light will be refracted or reflected several times in the main layer 101 between the upper and lower surface layers 102, 103 before being output from the upper surface (light-output surface). The number of refractions or reflections of light is increased inside the plate body 10 before being output from the upper surface (light-output surface) of the diffusion plate, and thereby, the light can be diffused more effectively, and the effect of shading MURA can be improved to produce a uniform surface light source.

In this embodiment, the plurality of first diffusion particles 1011 contained in the first diffusion particle additive include at least one of the following polymer material diffusion particles: silicone beads, acrylic beads (PMMA beads), polystyrene beads (PS beads), acrylic-polystyrene copolymer beads (PMMA-PS beads). Wherein, the applicable range of particle size of the first diffusion particles 1011 is between 0.5-10 μm, but the best embodiment of the range is between 1-4 μm. The value of the first material refractive index is between 1.42 and 1.5. The applicable range of the first weight percentage of the first diffusion particle additive added in the main layer 101 is between 0.5-10%, but the best embodiment of the range is between 1-4%. The first and second diffusion particle additives described herein are commercially available conventional products.

In the present invention, the plurality of second diffusion particles 1021, 1031 included in the second diffusion particle additive can have two kinds, the first kind is inorganic diffusion particles, and the second kind is polymer material diffusion particles. In the first kind, the plurality of second diffusion particles 1021, 1031 included in the second diffusion particle additive may include at least one of the following inorganic particles: calcium carbonate, barium sulfate, titanium oxide, talc, mica, boron nitride; wherein, the applicable range of particle size of the second diffusion particles 1021, 1031 is between 0.01-10 μm, but the best embodiment of the range is between 0.05-8 μm; the value of the second material refractive index is between 1.5 and 2.6; the applicable range of the second weight percentage of the second diffusion particle additive added in the upper and lower surface layers 102, 103 is between 0.1-3%, but the best embodiment of the range is between 0.1-1.5%. In the second kind, the plurality of second diffusion particles 1021, 1031 included in the second diffusion particle additive may include at least one of the following polymer material diffusion particles: silicone beads, Acrylic beads (PMMA beads), polystyrene beads (PS beads), acrylic-polystyrene copolymer particles (PMMA-PS beads); wherein, the applicable range of particle size of the second diffusion particles 1021, 1031 is between 10-50 μm, but the best embodiment of the range is between 15-25 μm; the value of the second material refractive index is between 1.42 and 1.5; the applicable range of the second weight percentage of the second diffusion particle additive added in the upper and lower surface layers 102, 103 is between 1-20%, but the best embodiment of the range is between 5-10%; moreover, in this second kind, the second weight percentage must be greater than the first weight percentage, and the particle size of the second diffusion particles 1021, 1031 is larger than the particle size of the first diffusion particle 1011. By using the second diffusion particle additive defined in the first kind and the second kind to match the first diffusion particle additive defined above, it can ensure that the refractive index of the upper and lower surface layers 102, 103 is substantially higher than the refractive index of the main layer 101, so as to achieve the features of more effective diffusion of light, enhanced shading of MURA, and better effect of generating a uniform surface light source.

As shown in FIG. 1, in the first embodiment of the diffusion plate of the present invention, a plurality of microstructures 1022, 1032 are respectively arranged on the upper surface and the lower surface of the plate body 10 in order to further improve the light divergence effect of the diffusion plate. In addition, the main layer 101 of the plate body is formed by foam extrusion molding, and includes a plurality of microbubbles 1012 in the main layer 101. An applicable range of the weight reduction rate of the microbubbles 1012 to the main layer 101 is 5-30%, but the best range of the weight reduction rate is between 10-20%, and an average size of the microbubbles 1012 is between 60-800 μm; wherein, a calculation formula of the weight reduction rate is:

weight reduction rate (%)=$(W1-W2)/W2*100\%$;

$W1 = H*(L1*L2*D)$;

wherein:
H is an average thickness of the plate body (mm);
L1 is a length of the main layer (mm);
L2 is a width of the main layer (mm);
D is a density of a raw material of the main layer (g/mm$^3$);
W1 is a theoretical weight (g) of the main layer, that is, the weight when the microbubbles are not included;
W2 is an actual weight (g) of the main layer, that is, the actual weight of the main layer containing a plurality of the microbubbles is actually weighed by a scale.

In a preferred embodiment, the microbubbles 1012 are generated by adding a foaming agent and a nucleating agent during the foam extrusion molding of the main layer 101; the nucleating agent comprises at least one of the following: calcium carbonate, silicon dioxide, and calcium oxide. The practical range of the weight percentage of the added nucleating agent is 0.01%-5%, but the preferred range is 0.1%-0.5%. The weight reduction rate of the microbubbles 1012 can be controlled by the amount of the foaming agent added, and the control method of the bubble size of the microbubbles 1012 can be the addition of the nucleating agent and the adjustment of the process temperature. The process temperature of the foaming co-extrusion process of the multi-layer plate body 10 of the diffusion plate of the present invention is adjusted depending on the type of raw material resin and foaming agent. The process temperature of the present invention is the general polycarbonate process temperature, and the optimum temperature is between 220~270° C.

Figure 2A:
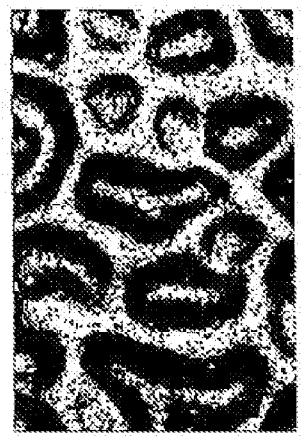
FIG. 2A, FIG. 2B and FIG. 2C are schematic diagrams of three different embodiments of microstructures arranged on the upper and lower surfaces of the diffusion plate of the present invention.
Figure 2B:
Figure 2C:
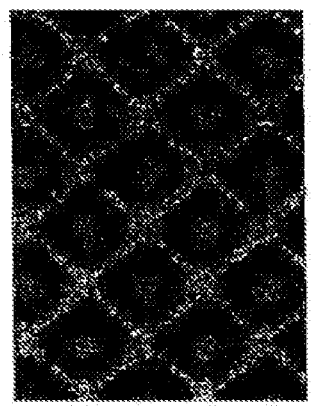

Please refer to FIG. 2A, FIG. 2B and FIG. 2C, which are schematic diagrams of three different embodiments of microstructures arranged on the upper and lower surfaces of the diffusion plate of the present invention. The diffusion plate of the present invention is formed with a plurality of microstructures 1022, 1032 on the upper and lower surfaces of the plate body 10 by means of extrusion process. The microstructures 1022, 1032 have a plurality of convex and concave portions, and the structures of these concave and convex portions can be regularly or irregularly distributed on the upper and lower surfaces of the diffusion plate body 10. When viewing in the top view, the microstructures 1022, 1032 can be shaped like round, amoeba (as shown in FIG. 2A), irregular matte (as shown in FIG. 2B), pyramid-shaped (as shown in FIG. 2C), and other shapes. Among them, the overall luminance effect will be the best when the light-incident (light-input) surface of the plate body 10 is a mirror surface (smooth surface without any microstructure) and the light-exit (light-output) surface of the plate body 10 is provided with pyramid-shaped microstructures.

Since the structures and functions of most elements of the embodiments illustrated below are similar or the same as those of the previously illustrated embodiment, the same or similar elements will be directly given the same names and numbers, and their details will not be repeated.

Figure 3:
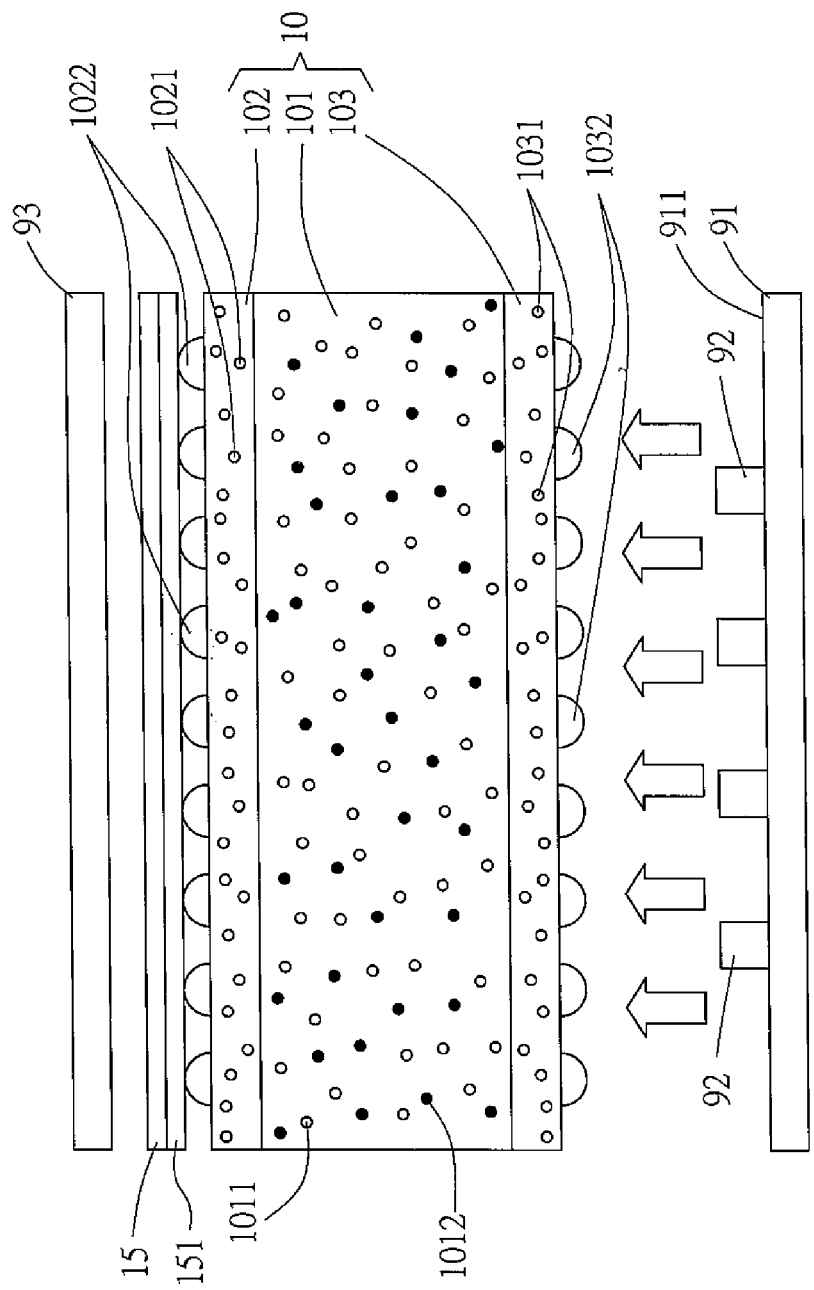
FIG. 3 is a cross-sectional schematic diagram of the second embodiment of the diffusion plate of the present invention installed on a backlight module with a low OD in order to form a backlight display.

Please refer to FIG. 3, which is a cross-sectional schematic diagram of the second embodiment of the diffusion plate of the present invention installed on a backlight module with a low OD in order to form a backlight display. In the second embodiment, the backlight module also comprises from bottom to top: a substrate 91, a plurality of light-emitting elements (LEDs) 92 and a diffusion plate of the present invention. The diffusion plate is located above the substrate 91 and also comprises: a plate body 10 (including a main layer 101, an upper surface layer 102 and a lower surface layer 103), a first diffusion particle additive (including the first diffusion particles 1011), a second diffusion particle additive (including the second diffusion particles 1021, 1031), a plurality of microbubbles 1012, and a plurality of microstructures 1022, 1032. Since the structures and functions of most elements of the second embodiment shown in FIG. 3 are similar or the same as those of the first embodiment shown in FIG. 1, the same or similar elements will be directly given the same names and numbers, and their details will not be repeated. The difference from the above-mentioned first embodiment is that, in the second embodiment shown in FIG. 3, the diffusion plate further comprises an upper optical film 15 attached to the upper surface of the plate body 10 by an optical glue 151; wherein the thickness of the optical glue 151 is between 5-20 μm.

The optical glue 151 and the upper optical film 15 described here are conventional products available on the market. The optical glue 151 is used as an adhesive medium for adhering the upper optical film 15 to the upper surface of the plate body 10. The upper optical film 15 provides the color conversion function of converting blue light into white light, and is a commercially available product. Thereby, the present invention can use the blue LEDs as the light-emitting elements 92, and convert the blue light into uniform white light by the upper optical film 15 pasted on the upper surface of the plate body 10 of the diffusion plate, and thereby providing the function of white light backlight module.

Figure 4:
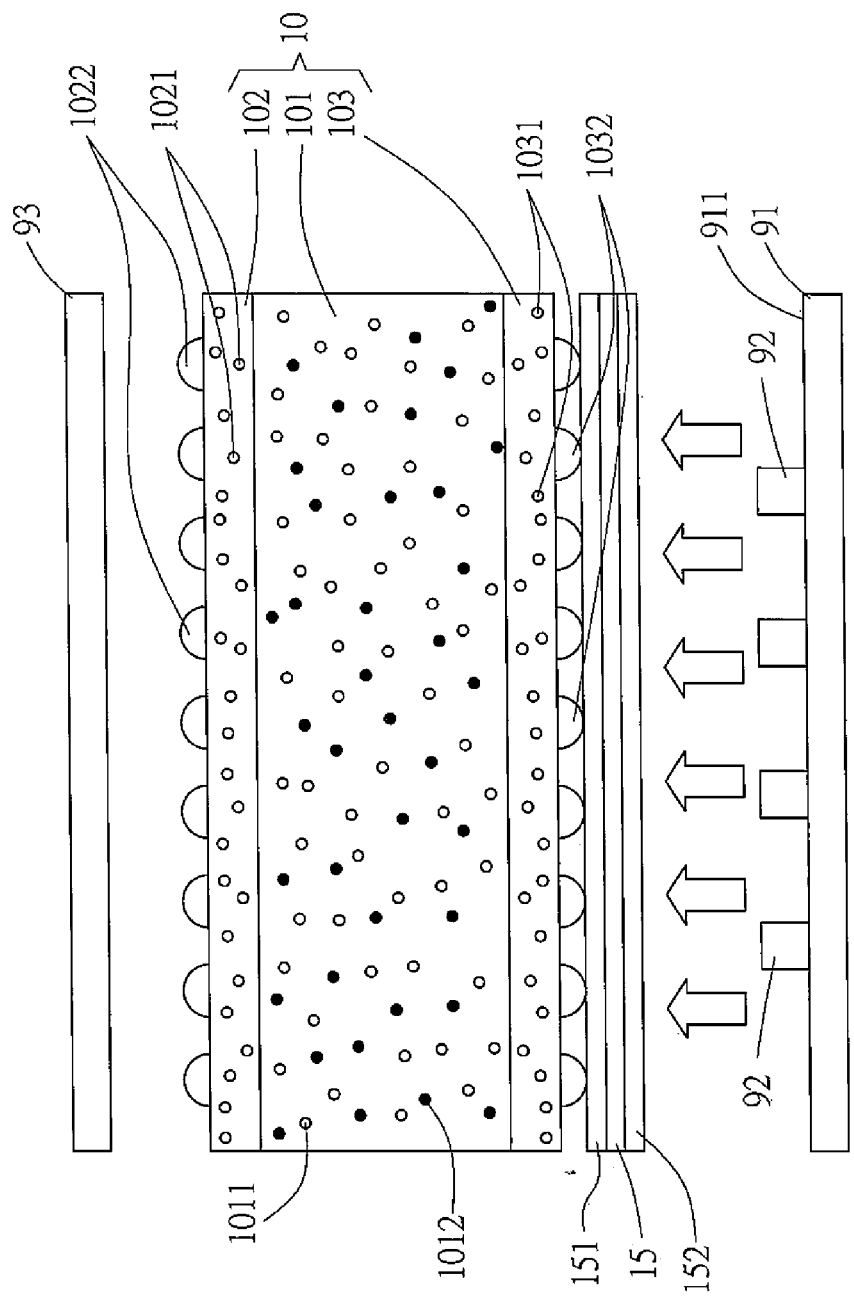
FIG. 4 is a cross-sectional schematic diagram of the third embodiment of the diffusion plate of the present invention installed on a backlight module with a low OD in order to form a backlight display.

Please refer to FIG. 4, which is a cross-sectional schematic diagram of the third embodiment of the diffusion plate of the present invention installed on a backlight module with a low OD in order to form a backlight display. In the second embodiment, the backlight module also comprises from bottom to top: a substrate 91, a plurality of light-emitting elements (LEDs) 92 and a diffusion plate of the present invention. The diffusion plate is located above the substrate 91 and also comprises: a plate body 10 (including a main layer 101, an upper surface layer 102 and a lower surface layer 103), a first diffusion particle additive (including the first diffusion particles 1011), a second diffusion particle additive (including the second diffusion particles 1021, 1031), a plurality of microbubbles 1012, and a plurality of microstructures 1022, 1032. Since the structures and functions of most elements of the third embodiment shown in FIG. 4 are similar or the same as those of the second embodiment shown in FIG. 3, the same or similar elements will be directly given the same names and numbers, and their details will not be repeated. The difference from the above-mentioned second embodiment is that, in the third embodiment shown in FIG. 4, the diffusion plate further comprises a lower optical film 15 and a reflective film 152 attached to the lower surface of the plate body 10 by an optical glue 151; wherein the thickness of the optical glue 151 is between 5-20 μm. The reflective film 152 is attached below the lower optical film 15. The optical glue 151, the reflective film 152 and the upper optical film 15 described here are conventional products available on the market. The optical glue 151 is used as an adhesive medium for adhering the lower optical film 15 and the reflective film 152 to the lower surface of the plate body 10. The lower optical film 15 provides the color conversion function of converting blue light into white light.

Figure 5:
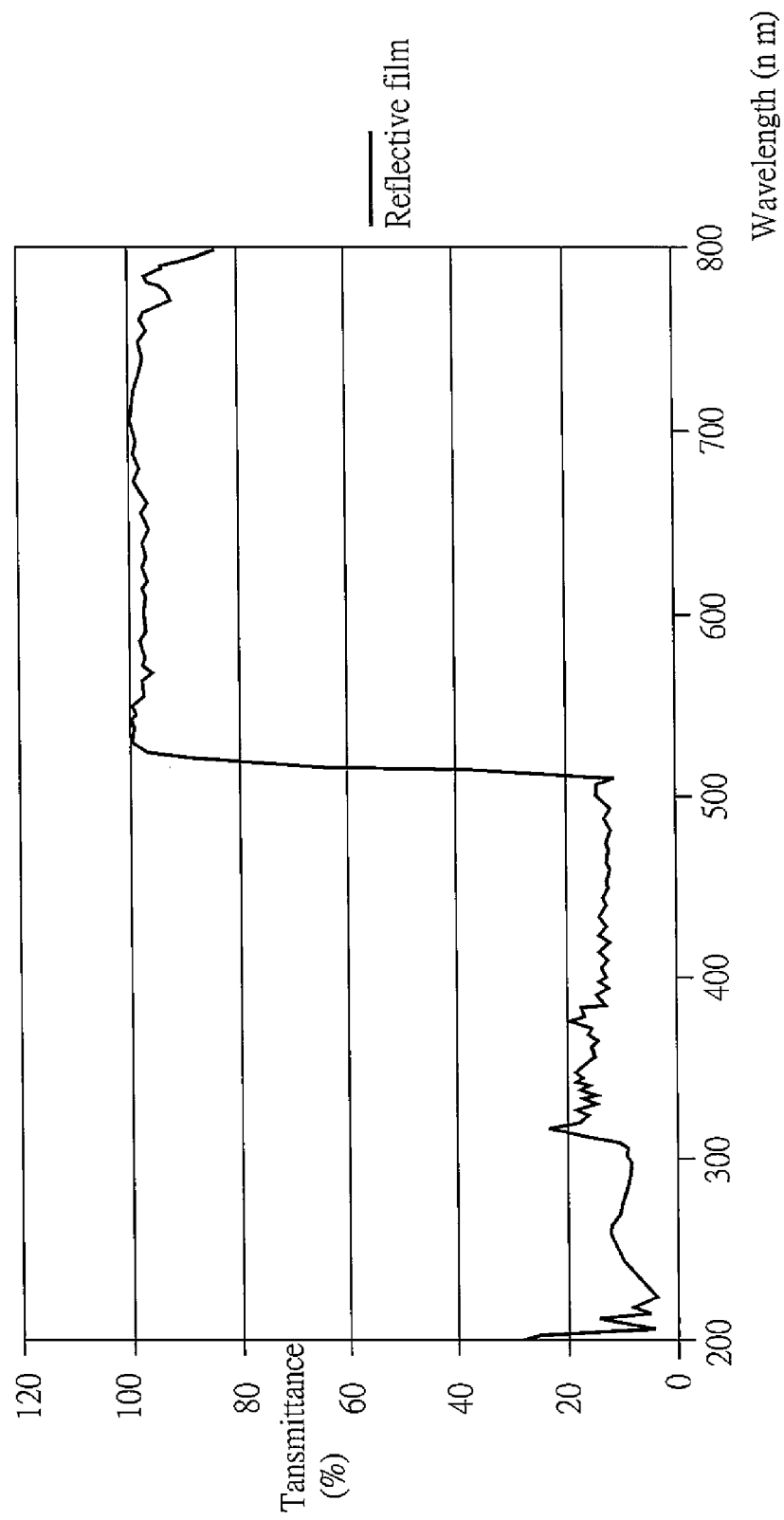
FIG. 5 is a curve diagram schematically showing the different reflectivity of the reflective film of the present invention for light of different wavelengths.

As shown in FIG. 5, which is a curve diagram schematically showing the different reflectivity of the reflective film of the present invention for light of different wavelengths. It can be seen from FIG. 5 that, the reflectance of the reflective film 152 for light with a wavelength of 500 nm or less is <20%, and the reflectance of the reflective film 152 for light with a wavelength of 500 nm or greater is >90%. In other words, the blue light emitted upward by the blue LEDs can pass through the reflective film 152 and the lower optical film 15 and then enter the interior of the plate body 10; on the contrary, the light converted into white light by the lower optical film 15 can no longer pass through the reflective film 152 downwards, but will be reflected by the reflective film 152 and emit light upward toward the upper surface of the plate body 10. Thereby, the present invention can use the blue LEDs as the light-emitting elements 92, and convert the blue light into uniform white light as well as emit the white light upward by the lower optical film 15 and the reflective film 152 pasted on the lower surface of the plate body 10 of the diffusion plate, and thereby providing the function of white light backlight module.

The present invention provides several different diffusion plates for testing according to the aforementioned technical concepts. The plate body of each tested diffusion plate is given different structure or material parameters, including: the particle size, refractive index, and additive amount of diffusion particles added to the main layer and the two surface layers; the materials of the main layer and the two surface layers; the thickness ratio of the two surface layers and the main layer relative to the plate body; the existence and type of surface microstructure; whether the foaming process is used to generate microbubbles in the main layer and the diameter of the microbubbles; whether there is an optical film and optical glue on the light-output surface (the upper surface of the plate body), and the thickness of the optical glue; whether there is a reflective film on the light-input surface (the lower surface of the plate body) . . . etc. Then, detect or observe several optical effects of these tested diffusion plates with different parameters one by one (including: luminance, light diffusivity, Mura, taste, etc.), and analyze and compare these optical effects, and then arrange the results in the following Tables (i.e., Table 1 to Table 6).

In Tables 1 to 6 below, fields such as "particle size", "refractive index", and "additive amount" respectively refer to the particle size, refractive index, and additive amount (weight percentage) of the plurality of diffusion particles contained in the diffusion particle additive added in the upper surface layer, main layer, or lower surface layer of the plate body of the diffusion plate respectively. The "thickness ratio" field refers to the ratio of the respective thicknesses of the upper surface layer, the main layer, or the lower surface layer to the thickness of the entire plate body. The "Material" field refers to the respective base materials of the upper surface layer, main board layer, or lower surface layer, where PS refers to polystyrene and MS refers to methyl acrylate. The "Surface Structure" field refers to whether there are microstructures on the upper surface (light-output surface) or the lower surface (light-input surface) of the plate, and the type of microstructures; wherein, in this field, "Foggy (referred as "FG" in Tables 1 to 6)" means that irregular matte microstructures are furnished, and "Pyramidal (referred as "PY" in Tables 1 to 6)" means that pyramid-shaped microstructures are furnished. The "Foaming Process" field refers to whether microbubbles are generated through the foaming process in the main layer, and the bubble diameter (referred as "BubD" in Tables 1 to 6) of the microbubbles. The "Optical Film" field refers to whether the optical film is pasted on the upper surface (light-output surface) of the plate through optical glue, and the thickness of the optical glue. The "Reflective Film" field refers to whether there is a reflective film furnished on the lower surface (light-input surface) of the plate. "Brightness (%)" and "Light Diffusion (%)" fields refer to the Brightness and Light Diffusion effects of the plate in percentage. The value of the field "Mura" is expressed from 1 to 5, where 1 means the most severe Mura, and 5 means the least Mura, so the optical performance is the best when Mura is 5. The value of the field "Taste" is scaled from 1 to 5, where 1 represents the worst optical taste and 5 represents the best taste.

Table 1 shows a list of structure and material information of each Comparative Example (referred as "CE" in Tables 1 to 6) and each Embodiment (referred as "EM" in Tables 1 to 6) of the diffusion plates tested. It can be seen from the contents of Table 1 that, for the diffusion plates of Comparative Example 1 and Comparative Example 2, the particle size, refractive index, and additive amount of the plurality of diffusion particles added to the two surface layers and the main layer of the plate body are "the same", so these two Comparative examples are diffusion plates produced based on conventional techniques.

In the other hand, in the diffusion plates of Embodiments 1 to 6 (EM1 to EM6), at least one or more of the "particle size", "refractive index" and "additive amount" of the diffusion particles added to the two surface layers of the plate body are "larger" than the diffusion particles added in the main layer of the plate body; such that, the refractive index of the two surface layers is higher than that of the main layer, so that the Embodiments 1 to 6 are diffusion plates made according to the aforementioned technical concepts of the present invention.

TABLE 1 a list of structure and material information of each Comparative Example and each Embodiment of the diffusion plates tested.

| Item | | CE1 | CE2 | EM1 | EM2 | EM3 | EM4 | EM5 | EM6 |
|---|---|---|---|---|---|---|---|---|---|
| light-input lower surface layer | particle size | 2 μm | 2 μm | 4 μm | 4 μm | 20 μm | 20 μm | 20 μm | 20 μm |
| | refractive index | 1.42 | 1.42 | 1.6 | 1.6 | 1.49 | 1.49 | 1.49 | 1.49 |
| | additive amount | 1% | 2% | 0.2% | 0.2% | 5% | 5% | 5% | 5% |
| | thickness ratio | 5% | 5% | 5% | 5% | 5% | 5% | 20% | 5% |
| | Material | PS | PS | PS | PS | PS | PS | PS | MS |
| | Surface Structure | FG | FG | FG | FG | FG | PY | PY | PY |
| main layer | particle size | 2 μm | 2 μm | 2 μm | 2 μm | 2 μm | 2 μm | 2 μm | 2 μm |
| | refractive index | 1.42 | 1.42 | 1.42 | 1.42 | 1.42 | 1.42 | 1.42 | 1.42 |
| | additive amount | 1% | 2% | 1% | 1% | 1% | 1% | 1% | 1% |
| | foaming process | NO | NO | NO | YES (20% BubD 400 μm) | YES (20% BubD 400 μm) | YES (20% BubD 400 μm) | YES (20% BubD 400 μm) | YES (20% BubD 400 μm) |
| | Material | PS | PS | PS | PS | PS | PS | PS | PS |
| | particle size | 2 μm | 2 μm | 4 μm | 4 μm | 20 μm | 20 μm | 20 μm | 20 μm |
| | refractive index | 1.42 | 1.42 | 1.6 | 1.6 | 1.49 | 1.49 | 1.49 | 1.49 |

TABLE 1-continued a list of structure and material information of each Comparative
Example and each Embodiment of the diffusion plates tested.

| Item | | CE1 | CE2 | EM1 | EM2 | EM3 | EM4 | EM5 | EM6 |
|---|---|---|---|---|---|---|---|---|---|
| additive amount | | 1% | 2% | 0.2% | 0.2% | 5% | 5% | 5% | 5% |
| thickness ratio | | 5% | 5% | 5% | 5% | 5% | 5% | 20% | 5% |
| Material | | PS | PS | PS | PS | PS | PS | PS | MS |
| Surface Structure | | FG | FG | FG | FG | FG | PY | FG | FG |

In Table 2 below, diffusion particle additives are added to the main layer of the diffusion plates of Embodiment 1 (EM1), Embodiment 2 (EM2), Embodiment 2-1 (EM2-1), Embodiment 3 (EM3), and Embodiment 3-1 (EM3-1); in some of these Embodiments, the main layer also has microbubbles formed by a foaming process. In addition, the upper and lower surface layers of the diffusion plate of each Embodiment are added with diffusion particle additives with relatively high particle sizes, refractive index or additive amounts. In Embodiment 2 (EM2), the diffusion particles added to the upper and lower surface layers are inorganic additives; in addition, the refractive index of the inorganic diffusion particles of the additives in the two surface layers is greater than the refractive index of the diffusion particles contained in the additives added to the main layer. In Embodiment 3 (EM3), the diffusion particles added to the upper and lower surface layers are organic additives (that is, polymer plasticizing material additives); in addition, the refractive index of the organic diffusion particles of the additives in the two surface layers is greater than the refractive index of the diffusion particles contained in the additives added to the main layer. The structures and materials of Embodiment 2-1 (EM2-1) and Embodiment 3-1 (EM3-1) generally correspond to Embodiment 2 and Embodiment 3 respectively, except that Embodiment 2-1 and Embodiment 3-1 further increases the concentration of additives (additive amount) in the upper and lower surface layers. It can be seen from Table 2 that, Embodiment 1, Embodiment 2, Embodiment 2-1, Embodiment 3, and Embodiment 3-1 are significantly better than Comparative Example 1 (CE) and Comparative Example 2 (CE2) in terms of brightness, light diffusion, and Mura. Moreover, the brightness performance of Embodiment 2-1 is worse than that of Embodiment 2, and the brightness performance of Embodiment 3-1 is also worse than that of Embodiment 3; and therefore, it can be proved that when the concentration of additives in the upper and lower surface layers increases, the brightness will reduce.

TABLE 2

Comparison table of diffusion particles with different particle sizes, refractive index or
additive amounts added to the two surface layers and the main layer of the diffusion plate

| Item | | CE1 | CE2 | EM1 | EM2 | EM2-1 | EM3 | EM3-1 |
|---|---|---|---|---|---|---|---|---|
| light-input lower surface layer | particle size | 2 μm | 2 μm | 4 μm | 4 μm | 4 μm | 20 μm | 20 μm |
| | refractive index | 1.42 | 1.42 | 1.6 | 1.6 | 1.6 | 1.49 | 1.49 |
| | additive amount | 1% | 2% | 0.2% | 0.2% | 2.5% | 5% | 15% |
| main layer | particle size | 2 μm | 2 μm | 2 μm | 2 μm | 2 μm | 2 μm | 2 μm |
| | refractive index | 1.42 | 1.42 | 1.42 | 1.42 | 1.42 | 1.42 | 1.42 |
| | additive amount | 1% | 2% | 1% | 1% | 1% | 1% | 1% |
| | foaming process | NO | NO | NO | YES (20% BubD 400 μm) | YES (20% BubD 400 μm) | YES (20% BubD 400 μm) | YES (20% BubD 400 μm) |
| light-emitting upper surface layer | particle size | 2 μm | 2 μm | 4 μm | 4 μm | 4 μm | 20 μm | 20 μm |
| | refractive index | 1.42 | 1.42 | 1.6 | 1.6 | 1.6 | 1.49 | 1.49 |
| | additive amount | 1% | 2% | 0.2% | 0.2% | 2.5% | 5% | 15% |
| Brightness | | 100% | 92% | 98% | 90% | 85% | 92% | 88% |
| Light Diffusion | | 80% | 85% | 88% | 92% | 93% | 92% | 93% |
| MURA 1 => 5(Best) | | 1 | 2 | 3 | 5 | 5 | 5 | 5 |

In Table 3 below, the upper and lower surfaces of Embodiment 3 are provided with foggy microstructures (FG), while the upper and lower surfaces of Embodiment 4 are provided with pyramid-shaped microstructures (PY). Comparative Example 1 and Comparative Example 2 do not have any microstructure. It can be seen from Table 3 that, Embodiment 4 with pyramid-shaped microstructures has higher brightness than Embodiment 3, and the MURA performance of light diffusion of these two Embodiments is the same. It proves that when the surface microstructures are pyramid-shaped, the diffusion plate can have higher brightness than the foggy microstructures.

TABLE 3

Comparison table of the diffusion plates with different surface microstructures on light-input and light-output surfaces

| Item | | CE1 | CE2 | EM3 | EM4 |
|---|---|---|---|---|---|
| light-input lower surface | particle size | 2 μm | 2 μm | 20 μm | 20 μm |
| | refractive index | 1.42 | 1.42 | 1.49 | 1.49 |
| | additive amount | 1% | 2% | 5% | 15% |
| | Surface Structure | NO | NO | FG | PY |
| main layer | particle size | 2 μm | 2 μm | 2 μm | 2 μm |
| | refractive index | 1.42 | 1.42 | 1.42 | 1.42 |
| | additive amount | 1% | 2% | 1% | 1% |
| | foaming process | NO | NO | YES (20% BubD 400 μm) | YES (20% BubD 400 μm) |
| light-emitting upper surface layer | particle size | 2 μm | 2 μm | 20 μm | 20 μm |
| | refractive index | 1.42 | 1.42 | 1.49 | 1.49 |
| | additive amount | 1% | 2% | 5% | 5% |
| | Surface Structure | NO | NO | FG | PY |
| Brightness | | 100% | 92% | 92% | 94% |
| Light Diffusion | | 80% | 85% | 92% | 92% |
| MURA 1 => 5(Best) | | 1 | 2 | 5 | 5 |

In the following Table 4, the diffusion plates of Embodiment 3, Embodiment 5, and Embodiment 6 respectively have different materials or have different thickness ratios of the main layer and the two surface layers. It can be seen from Table 4 that, the ratio of the thickness of the main layer to the total thickness of the two surface layers of the diffusion plates of Embodiments 3 and 6 is 9:1, while the ratio of the thickness of the main layer to the total thickness of the two surface layers of the diffusion plate of Embodiment 5 is 6:4. In addition, Embodiment 3 and Embodiment 6 perform better than Embodiment 5 in terms of light diffusion and MURA. It can be roughly deduced from this that the preferred implementation range of the ratio of the thickness of the main layer to the total thickness of the two surface layers of the diffusion plate of the present invention should be between 9:1 and 7:3. Moreover, because Embodiment 6 uses MS as the base material of the two surface layers and PS as the base material of the main layer, Embodiment 6 can achieve better MURA performance than Embodiment 3 (both surface layers and the main layer are made of PS material).

TABLE 4

Comparison table of material and thickness ratio changes of the main layer and the two surface layers of the diffusion plate

| Item | | CE1 | CE2 | EM3 | EM5 | EM6 |
|---|---|---|---|---|---|---|
| light-input lower surface layer | particle size | 2 μm | 2 μm | 20 μm | 20 μm | 20 μm |
| | refractive index | 1.42 | 1.42 | 1.49 | 1.49 | 1.49 |
| | additive amount | 1% | 2% | 5% | 5% | 5% |
| | thickness ratio | | | 5% | 20% | 5% |
| | Material | | | PS | PS | MS |
| main layer | particle size | 2 μm | 2 μm | 2 μm | 2 μm | 2 μm |
| | refractive index | 1.42 | 1.42 | 1.42 | 1.42 | 1.42 |
| | additive amount | 1% | 2% | 1% | 1% | 1% |
| | foaming process | NO | NO | YES (20% BubD 400 μm) | YES (20% BubD 400 μm) | YES (20% BubD 400 μm) |
| | thickness ratio | | | 90% | 60% | 90% |
| | Material | | | PS | PS | PS |
| light-emitting upper surface layer | particle size | 2 μm | 2 μm | 20 μm | 20 μm | 20 μm |
| | refractive index | 1.42 | 1.42 | 1.49 | 1.49 | 1.49 |
| | additive amount | 1% | 2% | 5% | 5% | 15% |
| | thickness ratio | | | 5% | 20% | 5% |
| | Material | | | PS | PS | MS |
| Brightness | | 100% | 92% | 92% | 96% | 92% |
| Light Diffusion | | 80% | 85% | 92% | 88% | 92% |
| MURA 1 => 5(Best) | | 1 | 2 | 5 | 4 | 5+ |

In Table 5 below, Embodiment 4-1 is based on the same structure and material of Embodiment 4 and an additional optical film is attached to the light-output surface of the diffusion plate. Comparative Example 3-1 is based on the same structure and material of Embodiment 3 but does not have any surface microstructure on the light-output surface of the diffusion plate. As can be seen from Table 5, the thickness of the optical glue adhered in Embodiment 7 is greater than 20 μm, resulting in lower brightness. In addition, the brightness of Comparative Example 3-1 is also lower because the light-output surface of the diffusion plate has no surface microstructure.

TABLE 5

Comparison table of diffusion plates with or without optical film and optical glue on the light-output surface

|  | Surface Structure on light-output surface | Optical Film | thickness of optical glue | Taste | Brightness |
| --- | --- | --- | --- | --- | --- |
| EM3 | NO | NO | NO | 5 | 100% |
| EM4-1 | YES | YES | 10 μm | 5 | 110% |
| EM7 | YES | YES | 30 μm | 5 | 98% |
| CE3-1 | NO | YES | 30 μm | 5 | 98% |

In Table 6 below, Embodiment 4-2 is based on the same structure and material of Embodiment 4 and an additional reflective film is attached to the light-input surface of the diffusion plate. It can be seen from Table 6 that, the diffusion plate of Embodiment 4-2 has a reflective film attached to the light-input surface, so compared to Embodiment 4, the diffusion plate of Embodiment 4-2 can achieve better taste at low OD.

TABLE 6

Comparison table of diffusion plates with or without reflective film adhered to the light-input surface

|  | Reflective Film on light-input surface | Taste (OD = 20 mm) | Taste when OD is decreased (OD = 15 mm) | Brightness |
| --- | --- | --- | --- | --- |
| EM3 | NO | 5 |  | 100% |
| EM3 | NO |  | 4 | 100% |
| EM4-2 | YES | 5 |  | 102% |
| EM4-2 | YES |  | 5 | 102% |

As can be seen from the contents of Tables 1 to 6 above, the structures and materials of Embodiment 4-1, Embodiment 4-2 and Embodiment 6 made according to the technical concepts of the present invention can be said to be the best applications and best embodiments of the diffusion plates in accordance with the present invention in low optical path (low OD), which can achieve relatively best optical performances in comparison to other embodiments and comparative examples.

In a preferred embodiment of the present invention, the light diffusion plate can be assembled on a backlight module with a plurality of blue light emitting diodes (LEDs) as the bottom light source. A plurality of microstructures having a plurality of concave portions and convex portions are formed on the surface of the diffusion plate. A quantum dot layer comprising a plurality of green quantum dots and a plurality of red quantum dots is applied on the concave portions of the microstructures. Then, a water-blocking and gas-blocking layer is arranged on the upper surface of the quantum dot layer. The quantum dot layer located in the concave portions is separated by the convex portions of the microstructures into small parts independent of each other. In this way, the water vapor and oxygen from the outside cannot penetrate the four side end faces of the quantum dot layer and invade the entire quantum dot layer, such that, the diffusion plate of the invention can have the advantages of simple process, low cost and high production yield. In the present invention, the upper surface of the diffusion plate is attached with the water-blocking and gas-blocking layer, in addition, the water vapor is prevented by the microstructures from entering the quantum dot layer from the side end faces, so that the distance of the water vapor entering the quantum dot layer from the side end faces is reduced to a minimum. In addition, because the diffusion plate and the microstructures formed thereon are integrally formed by extrusion process, subsequent processing and production costs can be reduced, and a relatively high production yield can be achieved.

Figure 6:
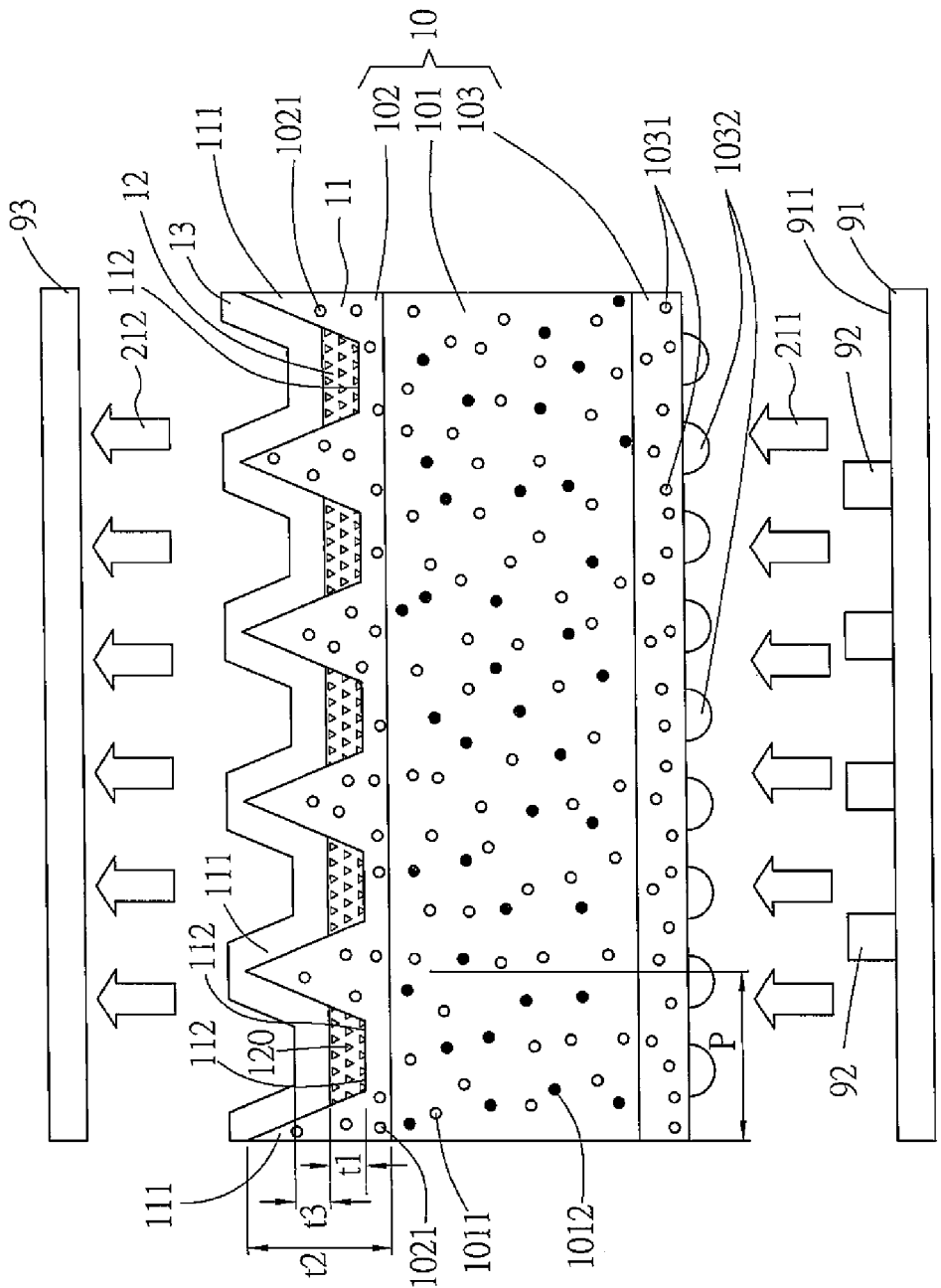
FIG. 6 is a cross-sectional schematic diagram of the fourth embodiment of the light diffusion plate of the present invention installed on a backlight module.
Figure 7:
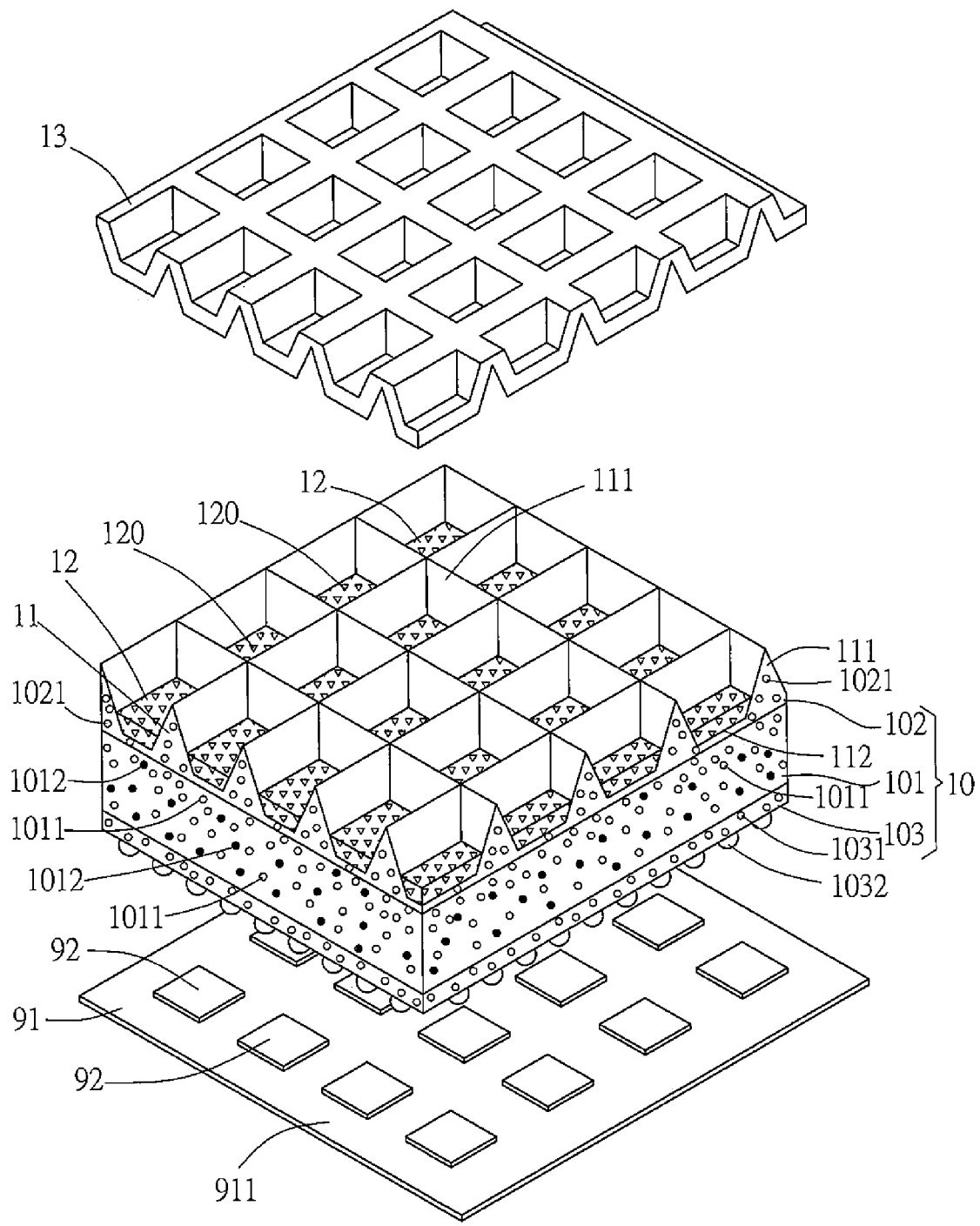
FIG. 7 is a three-dimensional exploded schematic diagram of the fourth embodiment of the light diffusion plate of the present invention installed on a backlight module.

Please refer to FIG. 6 and FIG. 7, which are respectively a cross-sectional schematic diagram and a three-dimensional exploded schematic diagram of the fourth embodiment of the light diffusion plate of the present invention installed on a backlight module. In this fourth embodiment, the backlight module of the present invention comprises, from bottom to top, a substrate 91, a plurality of light-emitting elements 92, and a diffusion plate. The diffusion plate is located above the substrate 91 and comprises: a plate body 10 (including main layer 101, upper surface layer 102 and lower surface layer 103), a first diffusion particle additive (including a plurality first diffusion particles 1011), a second diffusion particle additive (including a plurality second diffusion particles 1021, 1031), a plurality of microbubbles 1012, and a plurality of microstructures 11, 1032. The diffusion plate of this fourth embodiment also meets at least one of the following two conditions: Condition 1: The first material refractive index of the first diffusion particles 1011 is smaller than the second material refractive index of the second diffusion particles 1021, 1031; and, Condition 2: The first weight percentage of the first diffusion particle additive is less than the second weight percentage of the second diffusion particle additive. Since most of the components, structures and functions of the diffusion plate of the fourth embodiment shown in FIG. 6 and FIG. 7 are the same or similar to those of the first embodiment shown in FIG. 2, details of these same or similar components will not be described again. The difference from the aforementioned first embodiment is that, in the fourth embodiment shown in FIG. 6 and FIG. 7, the diffusion plate of the fourth embodiment further comprises: a quantum dot layer 12, and a water-blocking and gas-blocking layer 13; in addition, the plurality of microstructures 11 provided on the upper surface of the plate body 10 also have special structures different from the previous embodiments.

In this fourth embodiment, the plate body 10 is a three-layer structure with polystyrene (PS) as the base material, and the thickness of the plate body 10 is preferably between 0.8 mm and 2.5 mm. The plate body 10 of the diffusion plate is located above the substrate 91 and adjacent to the substrate 91. Generally, there are no other elements between the plate body 10 of the diffusion plate and the light-emitting elements 92 provided on the substrate 91. The quantum dot layer 12 needs uniform blue light intensity to convert red/green light and mix into uniform white light. Because the light intensity in the surrounding (edge) area is lower than the light intensity in the central area of the backlight display, it is easy to have insufficient red/green light conversion, resulting in the phenomenon of bluish light around the edge area of the backlight display. The plate body 10 of the present invention is formed by foam extrusion molding, and includes a plurality of microbubbles 1012 and diffusion particles 1011, 1021, 1031 in the plate body 10, which has a higher light refraction and diffusion effect, improves the light intensity in the surrounding edge area of the backlight display, and further improves the problem of bluish light. The plurality of microstructures 11 are disposed on the upper surface of the plate body 10 in an array form, and a plurality of convex portions 111 and a plurality of concave portions 112 are formed on the upper surface of the plate body 10. As shown in FIG. 7, each microstructure 11 includes an inverted pyramid-shaped or cone-shaped concave portion 112 and the convex portions 111 surrounding the concave portion 112. The plurality of the concave portions 112 are separated by the plurality of the convex portions 111, so the plurality of the concave portions 112 are independent and do not communicate with each other. The quantum dot layer 12 is disposed at the plurality of concave portions 112 on the upper surface of the plate body 10 in such a manner that, the quantum dot layer 12 is not provided at the plurality of convex portions 111. Wherein, the thickness of the quantum dot layer 12 is t1, the distance from a top of the convex portions 111 to a bottom of the concave portions 112 is t2, wherein t1<t2. In other words, the height t2 of the convex portion 111 of each microstructure 11 is larger than the thickness t1 of the quantum dot layer 12. The separated portions of the quantum dot layer 12 located in different concave portions 112 are not connected to each other. The water-blocking and gas-blocking layer 13 is disposed on the entire upper surface of the plate body 10 and is closely adhered to cover the plurality of convex portions 111 and the separated portions of the quantum dot layer 12. The water-blocking and gas-blocking layer 13 can isolate and avoid the external moisture and oxygen from invading the upper surface of the separated portions of the quantum dot layer 12. The thickness of the water-blocking and gas-blocking layer 13 is t3, which can be selected from existing commercially available water-blocking and gas-blocking films, which is directly attached on the convex portions 111 of the microstructures 11 and quantum dot layer 12 on the upper surface of the plate body 10. The distance between two adjacent convex portions 111 is P. In this fourth embodiment, the quantum dot layer 12 comprises a plurality of quantum dots 120 (QD for short). The quantum dots 120 can be selected from existing commercially available nanocrystal semiconductor materials, which are composed of II-VI, III-V or IV-VI group elements. The grain diameter of each of the quantum dots 120 is between 2 nm and 10 nm. Wherein, the light emission wavelengths of the plurality of quantum dots 120 in the quantum dot layer 12 may be between 490 nm and 650 nm. In this embodiment, the plurality of quantum dots 120 include a plurality of green quantum dots with light emission wavelengths of 520-530 nm and a plurality of red quantum dots with light emission wavelengths of 620-630 nm. The blue light 211 emitted upward by the light-emitting elements 92 can be mixed into white light 212 after passing through the quantum dot layer 12 and emitted upward from the upper surface of the plate body 10 toward the LCD panel 93.

In this embodiment, the applicable range of the thickness t1 of the quantum dot layer 12 is 5-150 μm, but the preferred implementation range of t1 is 10-40 μm. The applicable range of the distance t2 between the tops of the convex portions 111 and the bottoms of the concave portions 112 (or the height of the convex portions) is 6-200 μm, but the preferred implementation range of t2 is 25-50 μm. In addition, t1<t2. The applicable range of the thickness t3 of the water-blocking and gas-blocking layer 13 is 5-100 μm, but the preferred range of t3 is 10-30 μm. The maximum width of the convex portions 111 is 50-500 μm. The applicable range of the distance P between the two adjacent convex portions 111 is between 50-1000 μm, but the preferred implementation range of P is 250-500 μm.

Figure 8:
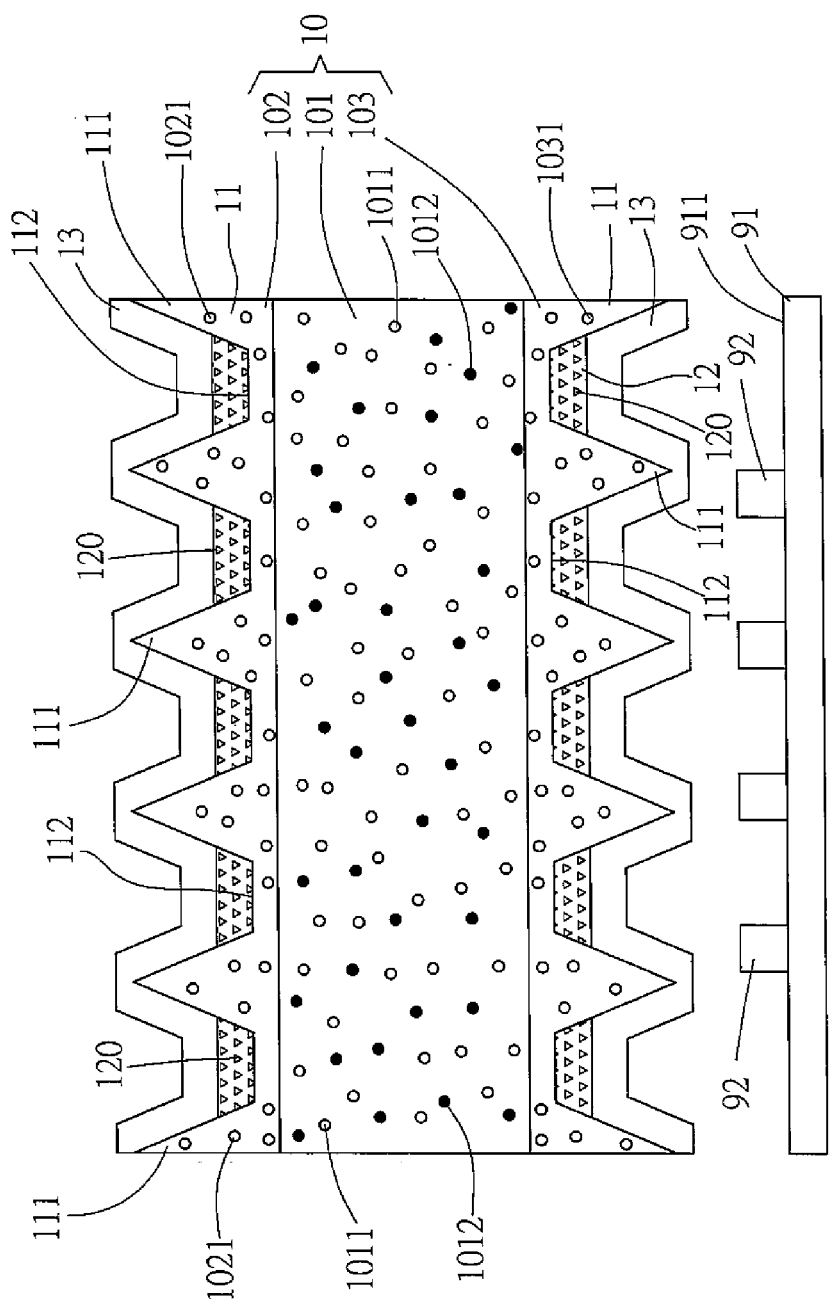
FIG. 8 is a schematic cross-sectional view of a fifth embodiment of the diffusion plate of the present invention installed on a backlight module.

Please refer to FIG. 8, which is a schematic cross-sectional view of a fifth embodiment of the diffusion plate of the present invention installed on a backlight module. In the fifth embodiment shown in FIG. 8, the backlight module of the present invention also comprises, from bottom to top, a substrate 91, a plurality of light-emitting elements 92, and a diffusion plate. The diffusion plate is also located above the substrate 91 and comprises: a multi-layer plate body 10 (including main layer 101, upper surface layer 102 and lower surface layer 103), a first diffusion particle additive (including a plurality first diffusion particles 1011), a second diffusion particle additive (including a plurality second diffusion particles 1021, 1031), a plurality of microbubbles 1012, and a plurality of microstructures 11, a quantum dot layer 12, and a water-blocking and gas-blocking layer 13. The diffusion plate of this fifth embodiment also meets at least one of the following two conditions: Condition 1: The first material refractive index of the first diffusion particles 1011 is smaller than the second material refractive index of the second diffusion particles 1021, 1031; and, Condition 2: The first weight percentage of the first diffusion particle additive is less than the second weight percentage of the second diffusion particle additive. Since the structures and functions of most elements of the fifth embodiment shown in FIG. 8 are similar or the same as those of the fourth embodiment shown in FIG. 6 and FIG. 7, the same or similar elements will be directly given the same names and numbers, and their details will not be repeated. The difference from the above-mentioned fourth embodiment is that, in the fifth embodiment shown in FIG. 8, the plurality of microstructures 11, the quantum dot layer 12, and the water-blocking and gas-blocking layer 13 are respectively disposed on both the upper and lower surfaces of the board body 10. In other words, in the fifth embodiment shown in FIG. 8, not only the upper surface of the plate body 10 is provided with the same plurality of microstructures 11, quantum dot layer 12, and water-blocking and gas-blocking layer 13 as the fourth embodiment shown in FIG. 6 and FIG. 7, but also the lower surface of the plate body 10 is further provided with the plurality of microstructures 11, quantum dot layer 12, and water-blocking and gas-blocking layer 13. The plurality of the microstructures 11 form a plurality of the convex portions 111 and a plurality of the concave portions 112 on the lower surface of the plate body 10. The concave portions 112 are separated by the convex portions 111, so the plurality of the concave portions 112 on the lower surface of the plate body 10 are independent and not communicated with each other. And, the quantum dot layer 12 located on the lower surface of the plate body 10 is disposed only at the concave portions 112 on the lower surface of the plate body 10. Moreover, the water-blocking and gas-barrier layer 13 on the lower surface of the board body 10 covers the convex portions 111 and the quantum dot layer 12 on the lower surface of the plate body 10. In this fifth embodiment, the structures of the plurality of microstructures 11, the quantum dot layers 12 and the water-blocking and gas-blocking layers 13 disposed on the upper and lower surfaces of the plate body 10 are substantially the same, in addition, the thickness of the quantum dot layers 12 are also smaller than the heights of the convex portions 111 of the microstructures 11.

While the present invention has been particularly shown and described with reference to a preferred embodiment, it will be understood by those skilled in the art that various changes in form and detail may be without departing from the spirit and scope of the present invention.

What is claimed is:

1. A diffusion plate for use in a backlight module, said backlight module comprising a substrate and a plurality of light-emitting elements arranged on the substrate in an array form; said diffusion plate being located above the substrate and comprising:
    a plate body, having an upper surface and a lower surface; said lower surface of the plate body facing the substrate; the plate body being a multi-layer structure and comprising a main layer, an upper surface layer and a lower surface layer; the upper surface layer being superimposed on a side of the main layer facing the upper surface, and the lower surface layer being superimposed on another side of the main layer facing the lower surface;
    a first diffusion particle additive, added to the main layer; the first diffusion particle additive including a plurality of first diffusion particles; a weight percentage of the added first diffusion particle additive in the main layer being a first weight percentage; each of the first diffusion particles having a first material refractive index; and
    a second diffusion particle additive, added to the upper surface layer and the lower surface layer; the second diffusion particle additive including a plurality of second diffusion particles; a weight percentage of the added second diffusion particle additive in the upper surface layer and the lower surface layer being a second weight percentage; each of the second diffusion particles having a second material refractive index;
    wherein the diffusion plate meets at least one of the following two conditions:
    Condition 1: the first material refractive index of the first diffusion particles is smaller than the second material refractive index of the second diffusion particles; and
    Condition 2: the first weight percentage of the first diffusion particle additive is less than the second weight percentage of the second diffusion particle additive;
    wherein, the first diffusion particles contained in the first diffusion particle additive include at least one of the following polymer particles: silicone beads, acrylic beads (PMMA beads), polystyrene beads (PS beads), and acrylic-polystyrene copolymer beads (PMMA-PS beads): wherein a particle size of the first diffusion particles is between 1-4 μm; a value of the first material refractive index is between 1.42 and 1.5; the first weight percentage of the first diffusion particle additive added in the main layer is between 1-4%;
    wherein, the second diffusion particles contained in the second diffusion particle additive include at least one of the following inorganic particles: calcium carbonate, barium sulfate, titanium oxide, talc, mica, and boron nitride; wherein a particle size of the second diffusion particles is between 0.05-8 μm; a value of the second material refractive index is between 1.5 and 2.6; the second weight percentage of the second diffusion particle additive added in the upper surface layer and the lower surface layer is between 0.1-1.5%.

2. The diffusion plate of claim 1, wherein, a base material of the plate body includes at least one of the following: polycarbonate (PC), polystyrene (PS), polymethyl methacrylate (PMMA, commonly known as acrylic), polyethylene (PE), polypropylene (PP), and polyethylene terephthalate (PET).

3. The diffusion plate of claim 1, wherein, the diffusion plate further comprises:
    a plurality of microstructures, disposed on at least the upper surface of the plate body in an array form; and
    an upper optical film, attached to the upper surface of the plate body by an optical glue; wherein a thickness of the optical glue is between 5-20 μm.

4. The diffusion plate of claim 1, wherein, the diffusion plate further comprises:
    a plurality of microstructures, disposed on at least the lower surface of the plate body in an array form;
    a lower optical film, attached to the upper surface of the plate body by an optical glue; and
    a reflective film, attached below the lower optical film; the reflectance of the reflective film for light with a wavelength of 500 nm or less is <20%, and the reflectance of the reflective film for light with a wavelength of 500 nm or greater is >90%.

5. The diffusion plate of claim 1, wherein, the diffusion plate further comprises:
    a plurality of microstructures, disposed on at least the upper surface of the plate body in an array form; the microstructures form a plurality of convex portions and a plurality of concave portions on the upper surface of the plate body; the concave portions being separated by the convex portions, such that the concave portions are independent and not communicated with each other;
    a quantum dot layer, disposed at the plurality of the concave portions on the upper surface of the plate body; wherein, a thickness of the quantum dot layer is t1, a distance from a top of the convex portions to a bottom of the concave portions is t2; wherein t1<t2; and
    a water-blocking and gas-blocking layer, disposed on the upper surface of the plate body and covering the plurality of the convex portions and the quantum dot layer.

6. The diffusion plate of claim 5, wherein, the lower surface of the plate body is also formed with the plurality of the microstructures, the quantum dot layer and the water-blocking and gas-blocking layer; the microstructures form the convex portions and the concave portions on the lower surface of the plate body; the concave portions on the lower surface are separated by the convex portions, so the concave portions on the lower surface of the plate body are independent and not communicated with each other; the quantum dot layer located on the lower surface of the plate body is disposed at the concave portions on the lower surface of the plate body; moreover, the water-blocking and gas-blocking layer disposed on the lower surface covers the plurality of the convex portions and the quantum dot layer on the lower surface of the plate body.

7. The diffusion plate of claim 5, wherein, a plurality of quantum dots is included in the quantum dot layer; the quantum dots are nanocrystal semiconductor materials composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm.

8. The diffusion plate of claim 5, wherein, t2 is between 6-200 μm; a thickness of the water-blocking and gas-blocking layer is t3, and t3 is between 5-100 μm.

9. The diffusion plate of claim 8, wherein, t2 is between 25 and 50 μm, t1 is between 10 and 40 μm, and t3 is between 10 and 30 μm.

10. The diffusion plate of claim 5, wherein, a maximum width of the convex portion is between 50 and 500 μm, and a distance between two adjacent convex portions is between 50 and 1000 μm.

11. The diffusion plate of claim 1, wherein, the plate body is formed by foam extrusion molding, and includes a plurality of microbubbles in the plate body; a weight reduction rate of the microbubbles to the plate body is 15-25%, and an average size of the microbubbles is between 60-800 μm; wherein, a calculation formula of the weight reduction rate is:

weight reduction rate (%)=($W1-W2$)/$W2$*100%;

$W1=H*(L1*L2*D)$;

wherein:

H is an average thickness of the plate body (mm);

L1 is a length of the plate body (mm);

L2 is a width of the plate body (mm);

D is a density of a raw material of the plate body (g/mm$^3$);

W1 is a theoretical weight (g) of the plate body, that is, the weight when the microbubbles are not included;

W2 is an actual weight (g) of the plate body, that is, the actual weight of the plate body containing a plurality of the microbubbles is actually weighed by a scale.

12. The diffusion plate of claim 11, wherein, the microbubbles are generated by adding a foaming agent and a nucleating agent during the foam extrusion molding of the plate body; the nucleating agent comprises at least one of the following: calcium carbonate, silicon dioxide, and calcium oxide; a weight percentage of the added nucleating agent is 0.1%-0.5%.

* * * * *